(12) United States Patent   (10) Patent No.: US 8,131,155 B2
Fukashiro et al.            (45) Date of Patent:     Mar. 6, 2012

(54) OPTICAL SIGNAL TRANSMISSION APPARATUS

(75) Inventors: Yasuyuki Fukashiro, Yokohama (JP); Eita Miyasaka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 503 days.

(21) Appl. No.: 12/339,133

(22) Filed: Dec. 19, 2008

(65) Prior Publication Data

US 2009/0238563 A1  Sep. 24, 2009

(30) Foreign Application Priority Data

Mar. 21, 2008 (JP) .................... 2008-074034

(51) Int. Cl.
*H04B 10/12* (2006.01)
(52) U.S. Cl. ........ 398/147; 398/192; 398/193; 398/194; 398/195; 398/196; 398/197; 398/198
(58) Field of Classification Search .................. None
See application file for complete search history.

(56) References Cited

U.S. PATENT DOCUMENTS

| | | | | |
|---|---|---|---|---|
| 5,542,078 A | * | 7/1996 | Martel et al. .................... 1/1 |
| 6,650,842 B1 | * | 11/2003 | Fee et al. .................. 398/147 |
| 6,671,464 B1 | * | 12/2003 | Kikuchi .......................... 398/65 |
| 2004/0062552 A1 | * | 4/2004 | Moeller ........................ 398/147 |
| 2004/0114936 A1 | | 6/2004 | Sugihara et al. |
| 2004/0151509 A1 | * | 8/2004 | Bulow ........................ 398/147 |
| 2004/0213578 A1 | | 10/2004 | Takahara et al. |
| 2005/0244164 A1 | * | 11/2005 | Miyashita et al. ............ 398/147 |
| 2009/0080902 A1 | | 3/2009 | Noheji et al. |
| 2010/0098423 A1 | | 4/2010 | Kunimatsu et al. |

FOREIGN PATENT DOCUMENTS

| | | |
|---|---|---|
| JP | 07-231297 | 8/1995 |
| JP | 09-326755 | 12/1997 |
| JP | 5930045 | 7/1999 |
| JP | 2002-0089724 | 7/2002 |
| JP | 2002-208892 | 7/2002 |
| JP | 2004-0131355 | 7/2004 |
| JP | 2004-222240 | 8/2004 |
| JP | 2005-117368 | 4/2005 |
| JP | 2007-274022 | 10/2007 |

* cited by examiner

*Primary Examiner* — Kenneth N Vanderpuye
*Assistant Examiner* — Darren E Wolf
(74) *Attorney, Agent, or Firm* — Antonelli, Terry, Stout & Kraus, LLP.

(57) ABSTRACT

There is provided an optical signal transmission apparatus having a stable dispersion compensation function without unnecessarily controlling a compensation value even when a main signal quality is deteriorated due to a factor other than dispersion or in the case of a transmission failure. When it is determined that a signal quality is deteriorated due to dispersion of a fiber by determining a control mode of a variable dispersion compensator by means of optical noise information and received power information in addition to bit error information of a received signal, a compensation value of the variable dispersion compensator is varied and a compensation value other than the dispersion of the optical fiber is held to an existing set value.

4 Claims, 10 Drawing Sheets

FIG. 9

| OPTICAL POWER | EXTERNAL CONTROL | OPTICAL NOISE | BIT ERROR INCREASE RATE | DETERMINATION |
|---|---|---|---|---|
| NORMAL | NOT COMMANDED | NOISE≦Xn | ΔCount/T≦Xe | CONTROL MODE B |
| ABNORMAL | D.C | D.C | D.C | ANOTHER FACTOR DETERMINATION CONTROL MODE C |
| D.C | COMMANDED | D.C | D.C | |
| D.C | D.C | NOISE>Xn | D.C | |
| D.C | D.C | D.C | ΔCount/T>Xe | |

91　92　93　94　95

OPTICAL SIGNAL TRANSMISSION APPARATUS

CLAIM OF PRIORITY

The present application claims priority from Japanese patent application serial no. 2008-074034, filed on Mar. 21, 2008, the content of which is hereby incorporated by reference into this application.

BACKGROUND OF THE INVENTION

The present invention relates to an optical signal transmission apparatus, and more particularly, to an optical signal transmission apparatus having a dispersion compensation function of compensating a waveform that is distorted due to the dispersion of optical fibers.

Due to rapid increase of data traffic representative on the Internet, an optical communication network for enabling large-capacity communication is required. In order to implement large-capacity communication, a wavelength division multiplexing (WDM) technology is used. In the WDM technology, several tens of wavelengths can be transmitted through one optical fiber. Long-range transmission over several hundreds of kilometers is available by using optical amplifiers or regenerators. In recent years, a wavelength multiplexing transmission apparatus of 10 Gbit/s per one wavelength has been put in practical use.

In designing a wavelength division multiplexing transmission system, a dispersion compensator (DC) is required. The dispersion compensator compensates waveform distortion caused by wavelength dispersion of the optical fiber. For example, a dispersion compensation amount of approximately −1600 ps/nm is required to compensate for wavelength dispersion of a single mode fiber (SMF) having a length of 80 km and wavelength dispersion of +20 ps/nm/km in a communication band of 1.55 μm. In a specific configuration, since the wavelength dispersion is compensated in an optimal waveform, a value different from the above-mentioned value may be selected by considering chirping of an optical signal or non-linear effects of the optical fiber. In the SMF, a zero dispersion wavelength in which the wavelength dispersion is 0 is 1.3 μm. As the type of the fiber, in addition to the SMF, various fibers such as a dispersion-shifted fiber (DSF) in which a dispersion amount in the optical signal wavelength is reduced by shifting the zero dispersion wavelength to 1.55 μm which is a wavelength band of the optical signal, etc. are used.

For such a fiber, a dispersion value of the optical fiber transmission path applied to determine a proper dispersion compensation amount is practically measured or estimated, and the dispersion compensator having the proper dispersion compensation value is mounted on the transmission apparatus. Currently, in a generally used dispersion compensator, a compensation value of a dispersion compensating fiber (DCF) is fixed. However, in the fixed dispersion compensator, there is a problem that plural fibers must be stocked. In a transmission rate of 40 Gbit/s or more, since a spectral width is extended, there is a problem of disagreement (residual dispersion) of batch compensation of a WDM signal by the DCF and the optimal compensation value of each wavelength, the seasonal variation of a fiber dispersion characteristic caused by a change of ambient temperature of the fiber, etc., disagreement of a small dispersion compensation value, or a polarization mode dispersion (PMD) greatly influences a transmission characteristic. In order to solve the above-problems, a variable dispersion compensator is considered.

For example, as the variable dispersion compensator for compensating the wavelength dispersion, a variable dispersion compensation device using a virtual image phase array (VIPA) disclosed in Japanese Patent Application National Publication No. 2000-511655 is used. In addition, a variable dispersion compensation device using fiber Bragg grating (FBG) or etalon is used as the variable dispersion compensator.

Further, for example, as the polarization mode dispersion compensator, a technology disclosed in Japanese Patent Registration No. 3281162 is known. Japanese Patent Registration No. 3281162 discloses that the polarization mode dispersion compensator includes a polarization conversion unit, a group delay application unit, a phase shifter, etc. and compensates waveform distortion caused by the polarization mode dispersion of an optical signal.

As another example, a known technology using a transversal equalizing circuit is disclosed in JP-A-2007-274022. An example of a method of controlling the dispersion compensator is disclosed in JP-A-2002-208892. As an example of a quality monitoring method for control, a method of monitoring an eye opening using an electronic circuit is disclosed in Japanese Patent Registration No. 3995094.

JP-A-H09(1997)-326755 discloses an automatic equalization system that performs equalization or adjustment of a discrimination point of the wavelength dispersion by measuring an error rate, an eye opening degree, a value of Q, and a clock signal level at a reception side.

JP-A-2004-222240 discloses a method and an apparatus of monitoring an optical signal that extract the characteristic of an eye pattern of the optical signal, acquire a factor for deterioration and a deterioration amount of the optical signal, and control a wavelength distortion compensation device.

In the related art, bit error information of a received signal is used to control a variable dispersion compensator. However, the bit error of the received signal may occur due to a factor other than dispersion. For example, noise temporarily increases due to four wave mixing (FWM) caused by a wavelength extension. As another example, since temporary tension is involuntarily applied to a fiber due to device installation work in the vicinity of a device, a loss between optical amplifiers increases and an optical signal-to-noise ratio (OSNR) is deteriorated, whereby the bit error is generated. In this case, when the variable dispersion compensator is controlled only by the bit error information of the received signal, the bit error may unnecessarily increase by being shifted from an optimal compensation value. As a further example, in a case when the fiber is removed during a repairing work, the variable dispersion compensator cannot be controlled while an optical signal is lost, resulting in taking an excessive amount of time to converge into the optimal dispersion compensation value and it takes considerable time to restart the service, at the time of inserting the fiber again. Even if an eye opening is used as information to control the variable dispersion compensator, the same problem occurs.

SUMMARY OF THE INVENTION

In order to solve the above-mentioned problem, there is provided an optical signal transmission apparatus that controls a variable dispersion compensator by using information to determine a factor for the bit error in addition to a bit error of a received signal so as not to vary a compensation value of the variable dispersion compensator even if a bit error increases when a signal quality is deteriorated due to factors other than the dispersion of a fiber As the information to determine the factor for the bit error, optical noise information and received optical power information may be used.

In one aspect, an optical signal transmission apparatus includes an optical signal transmitter unit; a variable dispersion compensator that adjusts a dispersion compensation amount to compensate waveform distortion caused by dispersion of an optical fiber; a control unit that controls the dispersion compensation amount of the variable dispersion compensator; a control mode determination unit that designates a control content of the control unit; an optical receiver unit; and a signal quality supervisory unit, wherein the control mode determination unit determines whether or not an optical signal power is within a proper range on the basis of optical power information received from the optical reception unit, and the control unit controls the variable dispersion compensator on the basis of a determination result of the control mode determination unit and quality information received from the signal quality supervisory unit.

In another aspect, an optical signal transmission apparatus includes an optical signal transmitter unit; a variable dispersion compensator that adjusts a dispersion compensation amount to compensate waveform distortion caused by dispersion of an optical fiber; a control unit that controls the dispersion compensation amount of the variable dispersion compensator; a control mode determination unit that designates a control content of the control unit; an optical signal reception unit; a signal quality supervisory unit; and a non-volatile memory, wherein the control mode determination unit determines whether or not an optical signal power is within a proper range on the basis of optical power information received from the optical reception unit, the control unit controls the variable dispersion compensator or maintains a compensation value set in the variable dispersion compensator with a compensation value stored in the non-volatile memory when the control mode determination unit determines that the optical signal power is out of the proper range, and the control unit controls the variable dispersion compensator on the basis of information from the signal quality supervisory unit when the control mode determination unit determines that the optical signal power is within the proper range.

BRIEF DESCRIPTION OF THE DRAWINGS

Preferred embodiments of the present invention will now be described in conjunction with the accompanying drawings, in which:

FIG. 9 is a diagram the condition of a control mode determination unit; and

DETAILED DESCRIPTION OF THE PREFERRED EMBODIMENTS

Figure 1A:
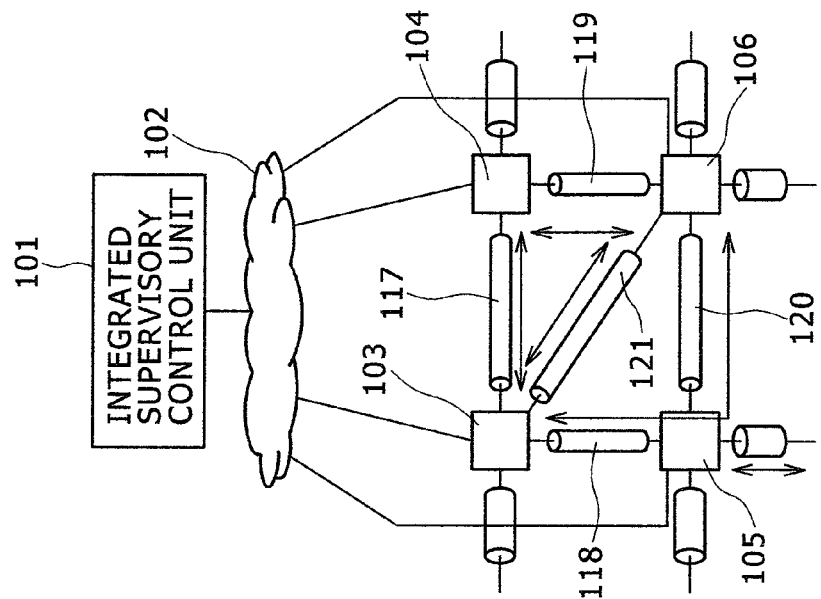
FIGS. 1A to 1C are block diagrams illustrating a network configuration.
Figure 1B:
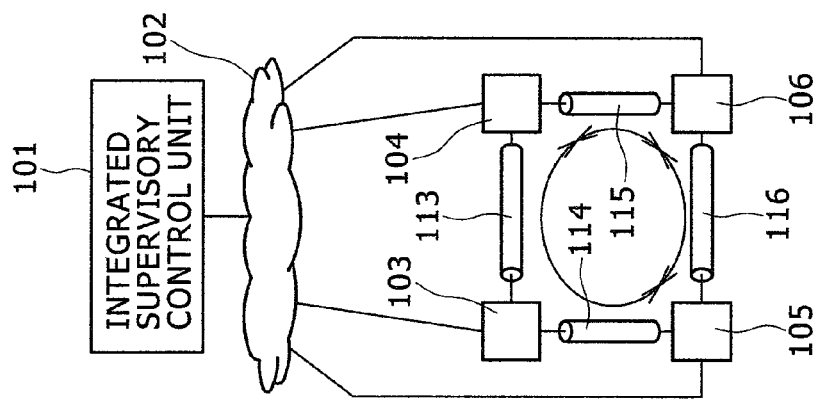
Figure 1C:
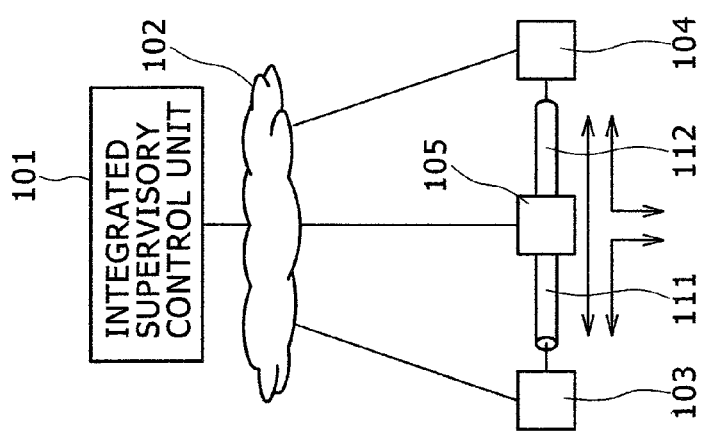
Figure 2:
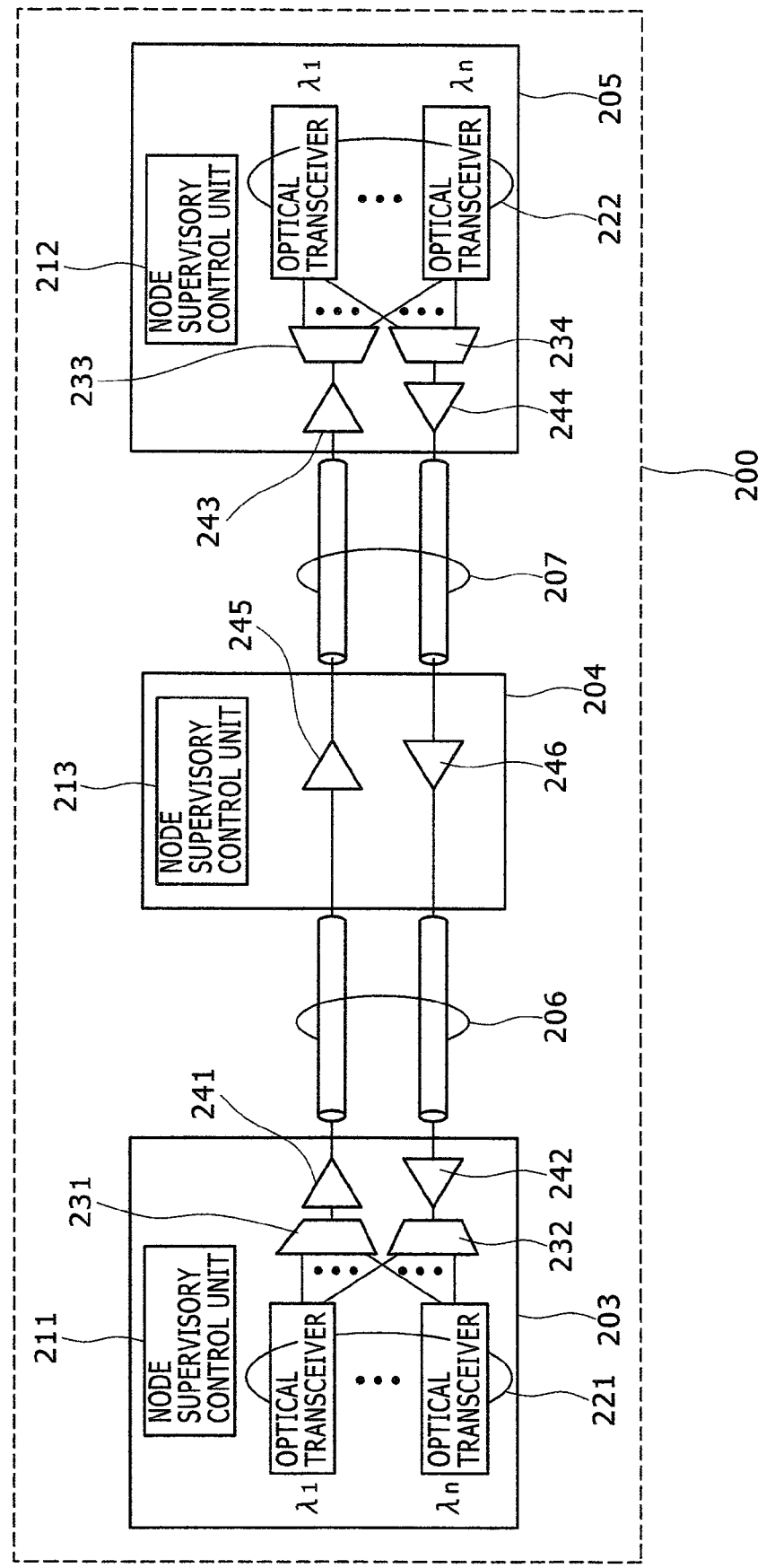
FIG. 2 is a block diagram of an optical transmission apparatus.
Figure 3:
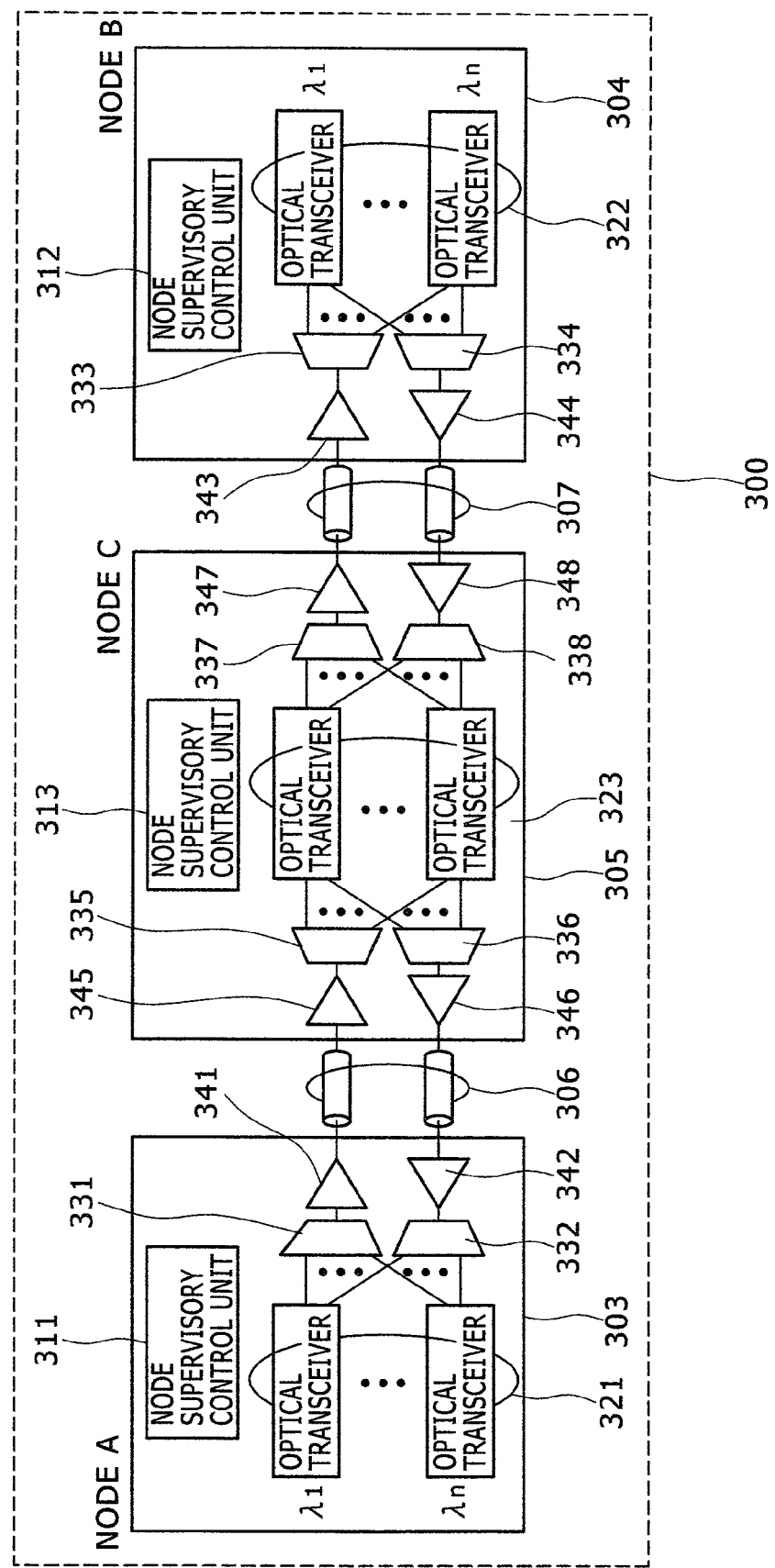
FIG. 3 is a block diagram of an optical transmission apparatus.
Figure 4:
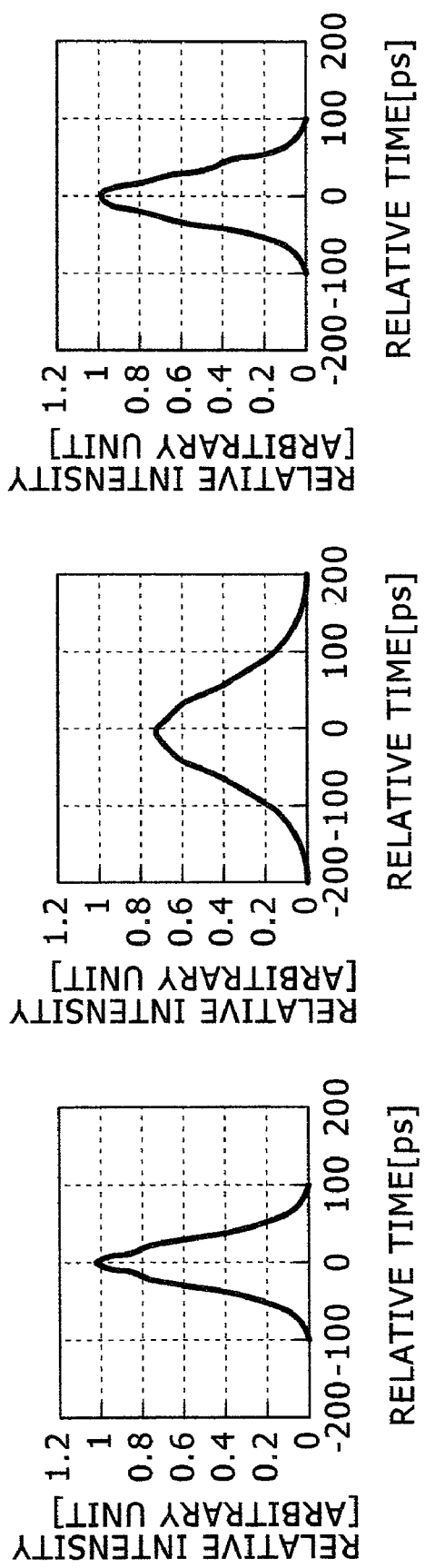
FIGS. 4A to 4C are pattern diagrams illustrating an effect of a dispersion compensator.
Figure 5:
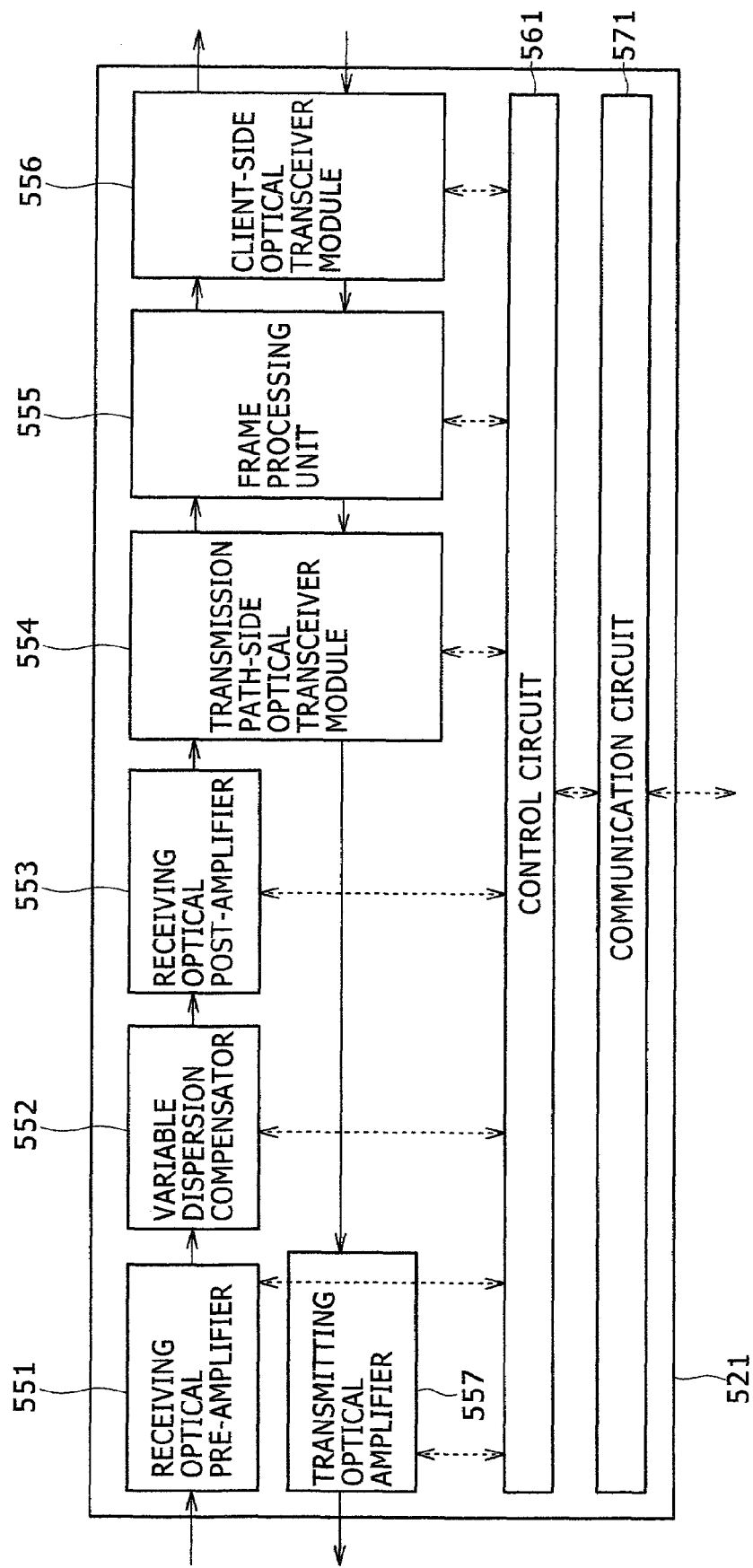
FIG. 5 is a block diagram illustrating the configuration of an optical transceiver.
Figure 6:
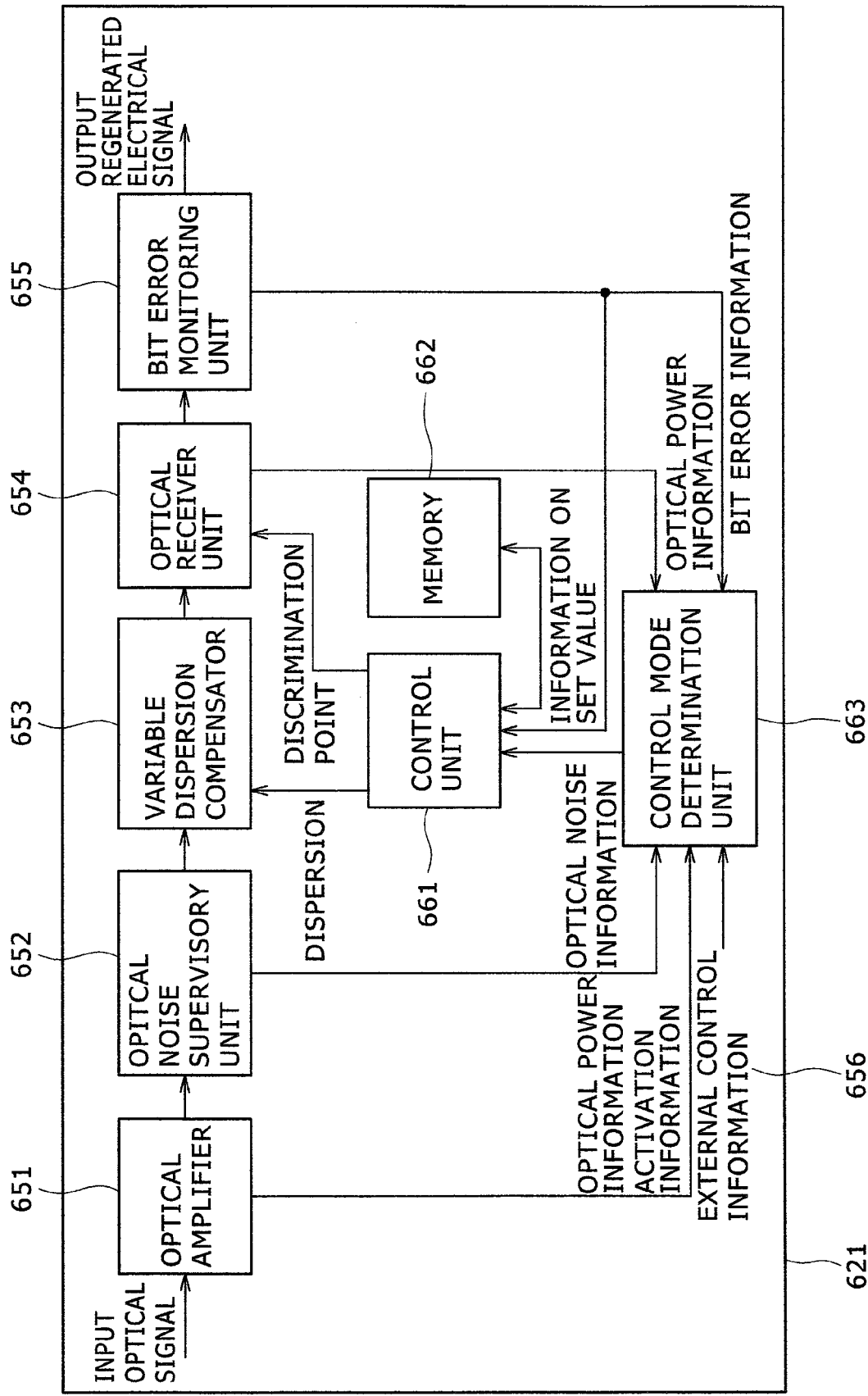
FIG. 6 is a block diagram illustrating the configuration of an optical transceiver.
Figure 7:
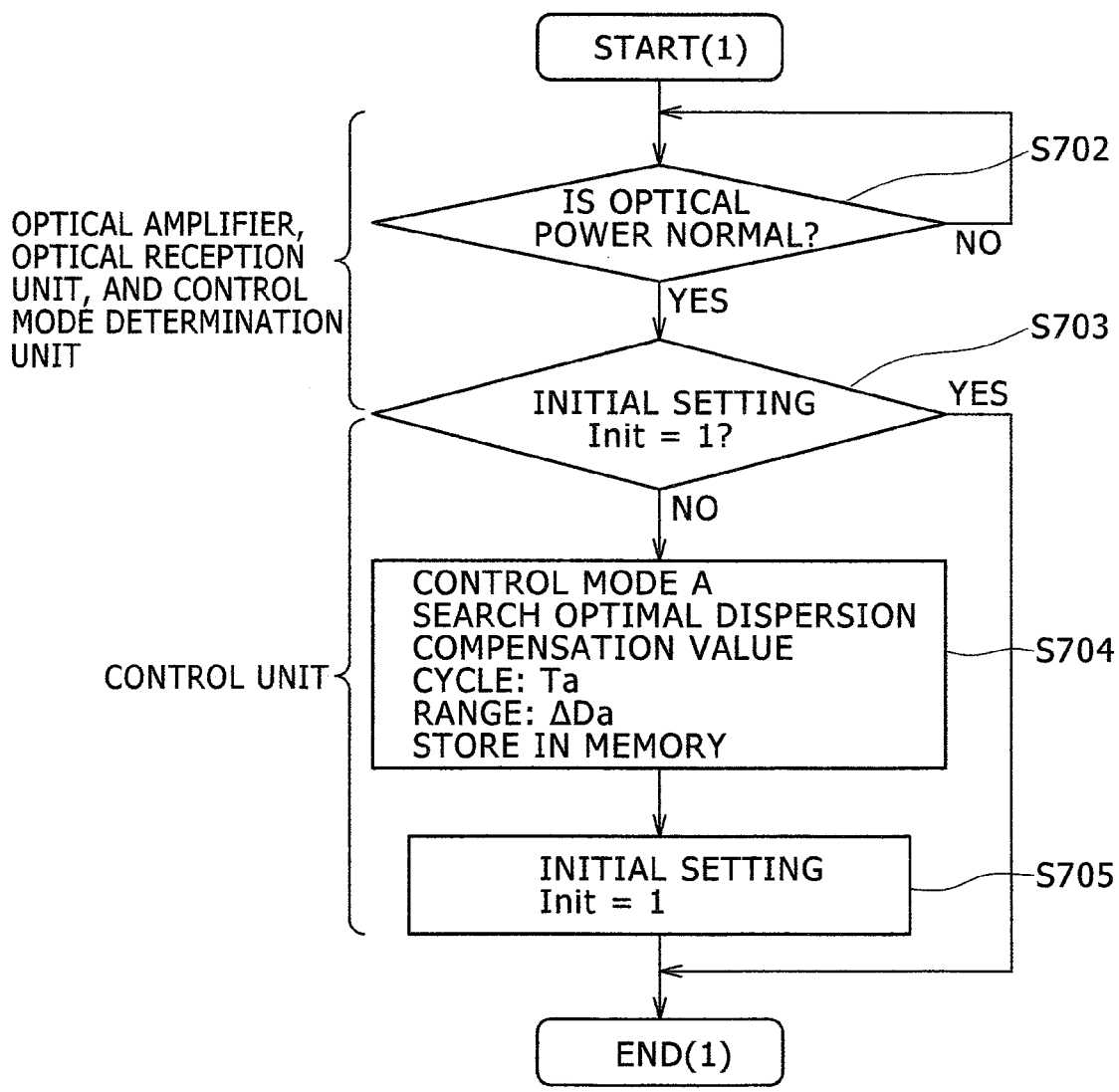
FIG. 7 is a flowchart illustrating the operation of an optical signal transmission apparatus.
Figure 8:
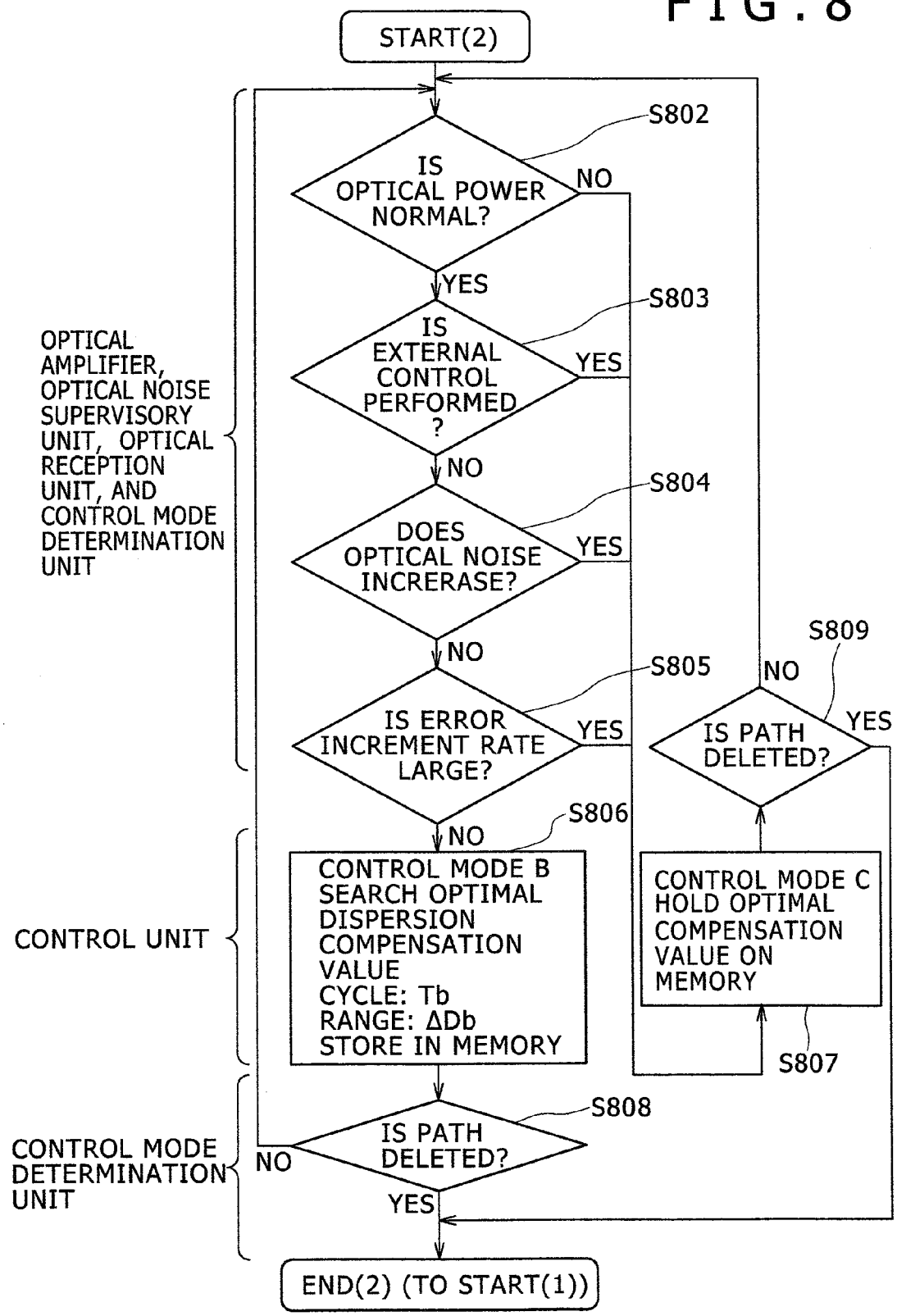
FIG. 8 is a flowchart illustrating the operation of an optical signal transmission apparatus.
Figure 10:
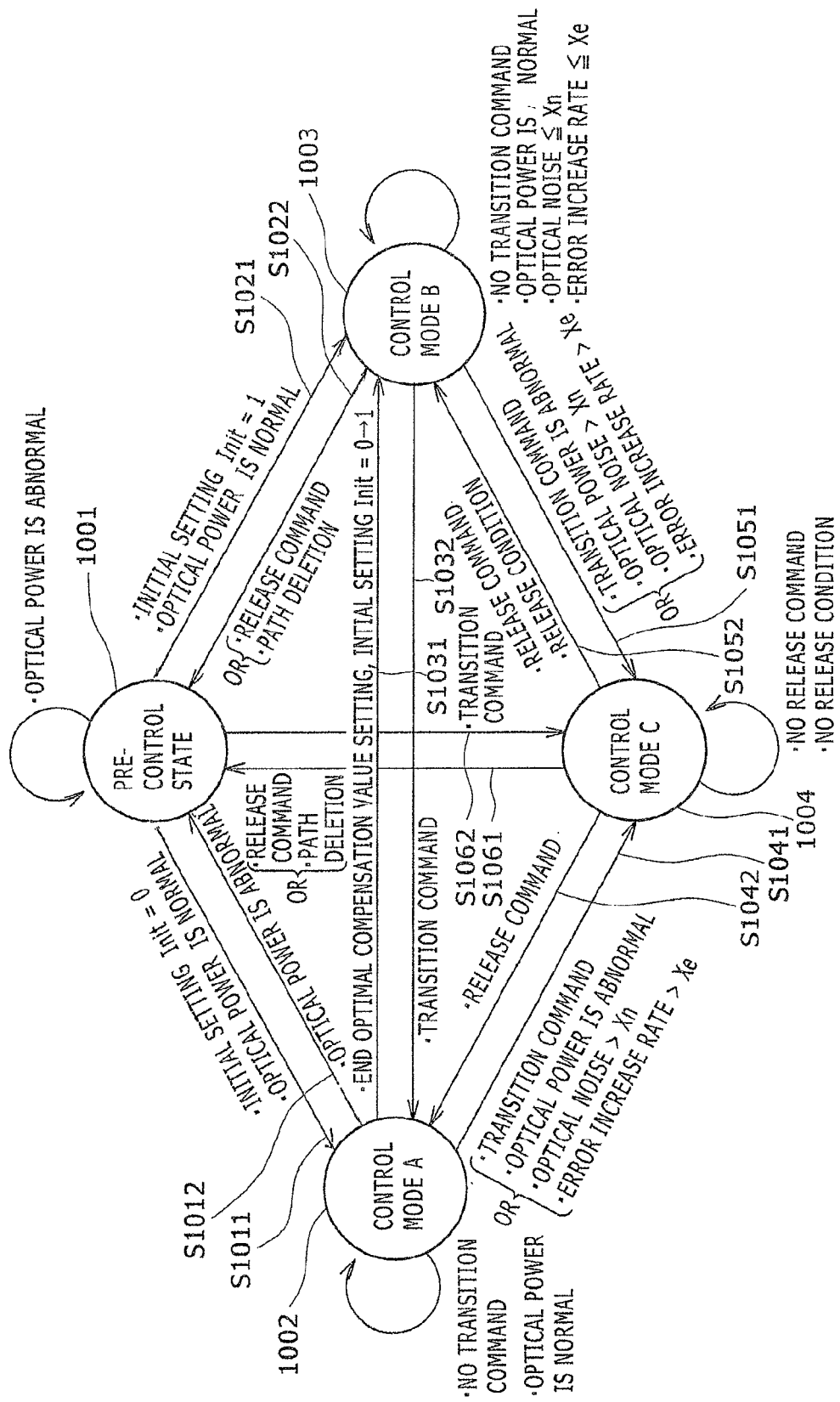
FIG. 10 is a diagram illustrating the state transition of an optical signal transmission apparatus.

Hereinafter, modes of the present invention will be described with reference to the accompanying drawings using the embodiments. FIGS. 1A to 1C are block diagrams illustrating a network configuration. FIG. 2 is a block diagram of an optical transmission apparatus. FIG. 3 is a block diagram of another optical transmission apparatus. FIGS. 4A to 4C are pattern diagrams illustrating an effect of a dispersion compensator. FIG. 5 is a block diagram illustrating the configuration of an optical transceiver. FIG. 6 is a block diagram illustrating the configuration of an optical transceiver in detail. FIG. 7 is a flowchart illustrating the operation of an optical signal transmission apparatus when a path is opened. FIG. 8 is a flowchart illustrating the operation of an optical signal transmission apparatus until a path is deleted in operation. FIG. 9 is a diagram illustrating the condition of a control mode determination unit. FIG. 10 is a diagram illustrating the state transition of an optical signal transmission apparatus.

Referring to FIGS. 1A to 1C, a network configuration adopting optical signal transmission apparatuses will be described. FIG. 1A illustrates a linear type network in which an optical node 103 and an optical node 104 are positioned at a termination of the linear network, an optical node 105 is interposed between the optical node 103 and the optical node 104, and the optical node 103, the optical node 104 and the optical node 105 are connected to each other through transmission path fibers 111 and 112. In this configuration, when at least a part of a signal added to the optical node 103 or the optical node 104 can be branched (dropped) into the optical node 105, another signal can be added to the optical node 105. Herein, a solid-line arrow shows that paths are established between the optical node 103 and the optical node 104, between the optical node 103 and the optical node 105, and between the optical node 105 and the optical node 104. It is apparent that the signal is not necessarily branched in the optical node 105 and the path may be formed between the optical node 103 and the optical node 105. The optical node 103, the optical node 104, and the optical node 105 are connected to an integrated supervisory control unit 101 via a supervisory control network 102. In one aspect of the role of the integrated supervisory control unit 101, the integrated supervisory control unit 101 performs configuration management, fault management, bandwidth management, performance management, etc. of a network including the state of each optical node. In another aspect of the role of the integrated supervisory control unit 101, the integrated supervisory control unit 101 controls plural optical nodes including the corresponding optical node to establish a communication channel or path by referring to information on the configuration management and information on the fault management and referring to an available resource or the information on the fault management of the corresponding optical node in order to secure a communication band corresponding to a demand between predetermined optical nodes.

FIG. 1B illustrates a ring type network. In the ring type network, the optical node 103, the optical node 104, the optical node 105, and an optical node 106 are connected to adjacent stations and transmission path fibers 113, 114, 115, and 116. Since the network forms a ring, protection can be performed in reverse transmission even when the fiber causes a problem at one point. Herein, a solid-line arrow shows that paths are established between the optical node 104 and the optical node 105 via the optical node 103, between the optical node 105 and the optical node 106, and between the optical node 104 and the optical node 106.

In a mesh type network shown in FIG. 1C, the optical node 103, the optical node 104, the optical node 105, the optical node 106, and another optical node not shown in the figure are connected to transmission path fibers in a lo mesh of a network. Herein, a solid-line arrow shows that paths are established between the optical node 103 and the optical node 104, between the optical node 103 and the optical node 106 via the optical node 105, between the optical node 103 and the optical node 106 directly connected to each other without passing through the optical node 105, and between the optical node 104 and the optical node 106. The mesh type network is more difficult to operate and manage than the ring type network, but the mesh type network is the network having higher flexibility in which a route of the path can be changed in accordance with various conditions.

In FIGS. 1B and 1C, the roles of the integrated supervisory control unit 101 and the supervisory control network 102 are the same as those of FIG. 1A. In each network type, the integrated supervisory control unit 101 can be implemented by a centralized control method using one or redundant server. As another method, each node supervisory control unit such as a node supervisory control unit 211 of FIG. 2 to be described below may adopt a distributed control method in which exchange of information on a network state or routing calculation is performed by communicating with the node supervisory control units or a method implemented by coordinating the centralized control method with the distributed control method. In the case of adopting the distributed control method, the integrated supervisory control unit 101 may be omitted or abbreviated. In coordinating the centralized control method with the distributed control method, functions such as the exchange of the information on the network state, the routing calculation, a control of each node for establishing the path, etc. may be allotted to the integrated supervisory control unit 101 and the node supervisory control unit 211. As a technology for controlling communication between devices in the distributed control method, a protocol group of generalized multi-protocol label Switching (GMPLS) specified by RFC3471-3473 of the Internet Engineering Task Force (IETF) can be used.

Next, referring to FIG. 2, the configuration of an optical signal transmission system 200 will be described. The optical signal transmission system 200 includes optical nodes 203 and 205 including optical transceivers 221 and 222, an optical node 204 performing linear repeater of optical signals, and transmission paths 206 and 207 connecting the optical nodes to each other. The optical nodes 203 and 205 include node supervisory control units 211 and 212, optical transceivers 221 and 222 in accordance with an available wavelength number, wavelength multiplexers 231 and 234 that multiplex optical signals λ1 to λn applied with each wavelength in a wavelength area to convert the optical signals into wavelength multiplexed signals, wavelength demultiplexers 232 and 233 that demultiplex the wavelength multiplexed signals into optical signals for each wavelength so as to convert the wavelength multiplexed signal into the original optical signals for each wavelength, and optical amplifiers 241 to 244 that amplify the wavelength multiplexed signals in a optical domain.

The optical transceivers 221 and 222 are connected to a client device by the optical signal or another function unit such as electrical switches (not shown) in the optical nodes 203 and 205 by an electrical signal. As an optical source used for the optical transceiver, an optical source outputting only a predetermined fixed wavelength or a wavelength variable optical source which can vary a transmission wavelength by a remote control may be used. The wavelength is selected to be suitable to a wavelength grid recommended by the ITU-T at G694.1 or G694.2. The number of wavelengths can be variously chosen among 8 channels, 16 waves, 20 waves, 40 waves, 64 waves, 80 waves, 128 waves, 160 waves, etc. by devising the transmission condition.

The wavelength multiplexers 231, 234, and demultiplexers 232, 233 may use a planar lightwave circuit (PLC) type element called arrayed waveguide grating (AWG). The configuration of the optical transceiver will be described below with reference to FIG. 5

The optical node 204 includes a node supervisory control unit 213 and optical amplifiers 245 and 246. The optical node 204 performs the linear repeater for extending a transmission distance, and the optical amplifiers 245 and 246 for compensating the signal loss due to the transmission paths 206 and 207 amplify the wavelength multiplexed signals. Any one of the optical amplifiers 245 and 246 which has a proper function or performance is selected in accordance with the transmission length or the type of the fiber so as to maintain a predetermined main signal quality. As one example of a main signal quality reference, a bit error rate is set to less than $10^{-12}$. Plural optical nodes 204 may be installed to further extend the transmission distance between the optical node 203 and the optical node 205. As the optical amplifiers 245 and 246, an optical amplifier using the Erbium-doped fiber, etc. is used.

In the optical node 204, the node supervisory control unit 213 supervises an optical power, the wavelength, an optical signal-noise ratio, etc. Herein, although omitted for simplifying the figure, an optical supervisory channel (OSC) using a wavelength dedicated to a supervisory control may be used in addition to the main signal for transmission of the supervisory control information between the optical nodes.

In the optical node 204, only an optical signal of a desired wavelength may be dropped and added among plural wavelength-multiplexed optical signals by using an optical multiplexing-demultiplexing filter or an optical switch in addition to the optical amplifiers 245 and 246. In particular, a device that performs the above-mentioned dropping and adding operations without converting the optical signal into the electrical signal is called an optical add-drop multiplexer (OADM). The OADM is often used in the linear configuration shown in FIG. 1A or the ring configuration shown in FIG. 1B. As a component that perform the dropping and adding operations in the optical domain by means of the OADM, a PLC type optical switch, a mechanical optical switch, a micro-electro-mechanical systems (MEMS) type optical switch, a liquid crystal type optical switch, a wavelength selective switch integrated with the wavelength multiplex-demultiplex function, etc. are commercially available.

FIG. 3 illustrates the configuration in which a regenerator function is disposed between optical nodes instead of a linear repeater function. An optical node 305 includes optical amplifiers 345, 346, 347, and 348, wavelength multiplexer/demultiplexer 335, 336, 337, and 338, optical transceivers 323 of the number depending on the available number of wavelengths, and a node supervisory control unit 313 and has the regenerator function. That is, the optical transceiver 323 converts the optical signal transmitted through the transmission path into the electrical signal and performs waveform shaping or digital quality supervisory. Thereafter, the optical transceiver 323 converts the electrical signal into the optical signal again to transmit the optical signal. More specifically, as a method for the quality supervisory, a bit error monitoring, etc. using a method called a bit interleaved parity (BIP) is performed. Whether a node having the regenerator function is installed, whether a node having the linear repeater function, or how many nodes having the regenerator function or the linear repeater function, between the optical node 303 and the optical node 304 are installed, is determined by a transmission design so as to realize a predetermined main signal quality.

Referring to FIGS. 4A to 4C, wavelength dispersion by the transmission path and the effect of dispersion compensation will be described. As an example, this calculation uses a single mode fiber (SMF). FIG. 4A illustrates a time-base waveform of a transmission signal. In this figure, the waveform shows Gaussian distribution and the peak intensity is normalized to 1. The half width at half maximum of the waveform is approximately 40 ps. FIG. 4B illustrates a waveform after the transmission of 80 km SMF having a wavelength dispersion 17 ps/nm/km. In order for the wavelength dispersion to cause a difference in group velocity between wavelength components included in a pulse, the intensity and the half width at half maximum of the waveform are extended to 0.72 and approximately 80 ps, respectively. FIG. 4C illustrates a waveform after dispersion compensation of −1360 ps/nm (=−17×80 ps/nm) is performed with respect to the waveform of FIG. 4B.

Next, referring to FIG. 5, the configuration of an optical transceiver will be described. An optical transceiver 521 includes a receiving optical pre-amplifier 551, a variable dispersion compensator 552, a receiving optical post-amplifier 553, a transmitting optical amplifier 557, a transmission path-side optical transceiver module 554, a frame processing unit 555, a client-side optical transceiver module 556, a control circuit, and a communication circuit 571.

For example, a client-side optical signal includes STM-16 (2.5 Gbit/s), STM-64 (10 Gbit/s), and STM-256 (40 Gbit/s). Besides, as the client signal, GbE (1 Gbit/s) provided by IEEE 802.3z, 10 GbE (10.3 Gbit/s) provided by IEEE 802.3ae, or 40 GbE/100 GbE provided by IEEE 802.3ba may be used.

The frame processing unit 555 performs addition or termination of overhead or error correction such as OTU1 (2.7 Gbit/s), OTU2 (10.7 Gbit/s), and OTU3 (42.8 Gbit/s) that are provided by OTN ITU-T G. 709. Further, the frame processing unit 555 may have a signal processing function in accordance with a modulation scheme of the optical signal. The frame processing unit 555 may be implemented by one LSI or by plural LSIs or ICs.

The transmission path-side optical transceiver module 554 modulates continuous light having a wavelength provided by ITU-T based on an electrical signal from the frame processing unit 555 in a modulation scheme suitable for transmission and output the optical signal. As the modulation scheme, modulation schemes such as non return-to-zero (NRZ), optical duo-binary (ODB), differential phase shift keying (DPSK), differential quadrature phase shift keying (DQPSK), etc. may be adopted. The D(Q)PSK includes various modulation schemes such as RZ-DSPK, NRZ-DPSK, RZ-DQPSK, NRZ-DQPSK, carrier-suppressed return-to-zero (CSRZ)-DQPSK, etc. In the transmission path-side optical transceiver module 554, the optical signal from the receiving optical post-amplifier 553 is converted into the electrical signal and is converted to a signal rate which can be processed by the frame processing unit 555.

The transmitting optical amplifier 557 adjusts the optical signal from the transmission path-side optical transceiver module 554 to power suitable to transmit the optical signal to the transmission path via the multiplex-demultiplexer or the wavelength multiplexing optical amplifiers. The optical power in transmitting the optical signal to the transmission path fiber is determined by considering the number of wavelengths, the transmission path loss between the optical nodes, an optical signal-to-noise ratio (OSNR) by the noise factor of the optical amplifier, or waveform distortion or a noise increase by a non-linear effect or wavelength dispersion or polarization mode dispersion in the fiber. As the non-linear effect, self phase modulation (SPM), cross phase modulation (XPM), four-wave mixing, etc. are known. The amount of the waveform distortion depends on the number of wavelengths, the dispersion of the fiber, the non-linear constant, input power to the fiber, the optical fiber loss, etc. The dispersion and the non-linear constant of the fiber also depend on whether the fiber is the SMF or a dispersion-shifted fiber.

The transmitting optical pre-amplifier 551 alleviates the deterioration of the OSNR due to the loss of the variable dispersion compensator 552. The variable dispersion compensator 552 improves the waveform of an optical signal deteriorated due to the dispersion of the fiber by adding dispersion with opposite sign to the dispersion of the fiber to the optical signal. The output power of the receiving optical post-amplifier 553 is adjusted so that optical power input to the transmission path-side optical transceiver module 554 is within an input dynamic range of the transmission path-side optical transceiver module 554 and an excellent received signal characteristics is obtained.

The control circuit 561 acquires various information from the receiving optical pre-amplifier 551, the variable dispersion compensator 552, the receiving optical post-amplifier 553, the transmitting optical amplifier 557, the transmission path-side optical transceiver module 554, the frame processing unit 555, and the client-side optical transceiver module 556. The control circuit 561 controls each of the components by using the information.

The communication circuit 571 communicates with the node supervisory unit shown in FIG. 3, sends the information of the optical transceiver 521 to the integrated supervisory control unit, and transmits the control information from the integrated supervisory control unit to the control circuit 561. Further, just one of the receiving optical pre-amplifier 551 and the receiving optical post-amplifier 553 may be used as long as it can achieve the predetermined main signal quality by the optical transmission design.

Next, referring to FIG. 6, the configuration of the optical transceiver used for the optical signal transmission apparatus will be described in more detail. FIG. 6 illustrates the optical signal transmission apparatus shown in FIGS. 2 and 3 or only parts required for description among the components of the optical transceiver shown in FIG. 5. An optical transceiver 621 includes an optical amplifier 651, an optical noise supervisory unit 652, a variable dispersion compensator 653, an optical receiver unit 654, a bit error supervisory unit 655, a control unit 661, a non-volatile memory 662, and a control mode determination unit 663. The optical amplifier 651 and the optical noise supervisory unit 652 are included in the receiving optical pre-amplifier 551 or the receiving optical post-amplifier 553 shown in FIG. 5. Similarly, the optical reception unit 654 is included in the transmission path-side optical transceiver module 554, the bit error supervisory unit 655 is included in the frame processing unit 555, and the control unit 661, the memory 662, and the control mode determination unit 663 are included in the control circuit 561.

Hereinafter, the operation of the optical transceiver 621 will be described. An input optical signal is amplified to a predetermined optical power by the optical amplifier 651. The optical noise supervisory unit 652 receives a part of the optical power including the amplified noise or the optical power at the wavelength for measuring the noise to supervise the optical noise. The variable dispersion compensator 653 gives dispersion having an opposite sign to the dispersion given by the optical fiber of the transmission path to the optical signal to perform the waveform shaping. The optical receiver 654 converts the input optical signal into an electrical signal while supervising the optical power of the input optical signal and, extracts a clock, and performs regeneration by a predetermined threshold by using the extracted clock. The bit error monitoring unit processes the bit error from BIP information included in the overhead.

It is important to control the variable dispersion compensator 653 only when the waveform distortion is improved by controlling the dispersion compensation value at the time of controlling. When the control is performed based on only the information on the bit error, the variable dispersion compensator may be incorrectly controlled because the waveform distortion or the noise increase which is not caused by the dispersion of the fiber cannot be discriminated from the waveform distortion which is caused by the dispersion of the fiber. Wrong control of the compensation dispersion value cause deviation from the optimal value, thereby unnecessarily increasing the bit error. The control mode determination unit 663 uses information on the bit error from the bit error monitoring unit 655, activation state information of the optical amplifier 651, information on the input optical power, information on the optical noise power from the optical noise supervisory unit 652, information on the optical power from the optical receiver unit 654, and external control information 656 as input information, and determines a control mode of the control unit 661.

The control unit 661 controls the variable dispersion compensator 653 on the basis of the determination of the control mode determination unit 663. Further, the control unit 661 stores the dispersion compensation value set with respect to the variable dispersion compensator 653 in the memory 662 and controls the variable dispersion compensator 653 on the basis of set-up information stored in the memory 662 when there is an instruction of the control mode determination unit 663.

In FIG. 6, the optical noise supervisory unit 652 is disposed at an output side of the optical amplifier 651. The optical noise supervisory unit 652 may be disposed at an input side of the optical amplifier 651. In this example, a case where there is no receiving optical post-amplifier 553 shown in FIG. 5 has been described, but even if there is the receiving optical post-amplifier 553, the operation is the same.

Referring to FIGS. 7 and 6, the operation of the optical signal transmission apparatus before and after the path is established will be described. First, as shown in FIGS. 1A to 1C, a set-up for establishing the path is performed in the optical transceiver via the node supervisory control unit and processing is started by a control command from the integrated supervisory control unit or signaling of the GMPLS. Next, the control mode determination unit 663 determines whether or not the optical power is normal on the basis of the information on the optical power from the optical amplifier 651 and the optical receiver unit 654 (S702). Next, an initial set-up state of the variable dispersion compensator 653, which is stored in the control unit 661 or the memory 662 is checked (S703). The control mode determination unit 663 determines that a control mode A is optimal when the optical power is normal and an initial set-up is not made (Init=0). The control unit 661 operates in the control mode A by receiving the determination result (S704). In the control mode A, an optimal dispersion compensation value is searched when the path is established in a state when the initial set-up is not made. Herein, the initial set-up means that the optimal dispersion compensation value adjusted in the control mode A is set with respect to combination of the variable dispersion compensator 653 and a transmission path to be compensated. An example for searching method in the control mode A is that the dispersion compensation value is selected so as to minimize the bit error counts after searching the relationship between dispersion compensation value and bit error counts by changing the dispersion value of the variable dispersion compensator 653 within the variable range of the variable dispersion compensator 653 or deduced dispersion value range of transmission path, ΔDa. An example of value of ΔDa is −500 ps/nm. At this time, a cycle Ta to change the compensation value of the variable dispersion compensator 653, is preferred to be as quick as possible in accordance with a response speed of the variable dispersion compensator 653. As a result, since a time required to stabilize the main signal quality to a predetermined bit error rate or less after a path establishing instruction can be shortened, it is possible to shorten the time to provide a service. Herein, the predetermined bit error rate is $10^{-12}$ or less, for example. The search method in the control mode A is not limited to the method described above, but any other method can be applied on the condition that the compensation value of the variable dispersion compensator 653 may be rapidly adjusted to a proper compensation value which can be realized by the variable dispersion compensator 653. When the control in the control mode A is finished, the control unit 661 changes the initial set-up state into a state in which the initial set-up is finished (Init=1) (S705), and terminates an operation in establishing the path, and proceeds to a control mode B or a control mode C.

Referring to FIGS. 8 and 6, the operation of the optical signal transmission apparatus after the path is opened and the optimal dispersion compensation value is set to the variable dispersion compensator 663 will be described. As shown in FIG. 7, when the initial set-up is finished, a determination processing of the control mode is started. Herein, it is important to change the compensation value of the variable dispersion compensator after the path is opened only when the compensation value corresponds to dispersion changes of a large time constant such as a seasonal variation of the dispersion of the fiber caused by a change of surrounding temperature of the fiber used in the transmission path. The reason for this is that a great improvement of the bit error due to a factor other than the above factor, i.e., the deterioration of OSNR, waveform distortion by PMD, or an increase of the bit error in accordance with the noise increase due to FWM may not be expected even though the dispersion value of the variable dispersion compensator 653 is changed.

Therefore, in this embodiment, the control mode determination unit 663 determines whether the optical power received from the optical amplifier 651 is valid (S802), whether the optical noise level increases by the optical noise supervisory unit 652 (S804), whether increasing rate of the bit error is high by the bit error monitoring unit 655 (S805), and whether there is an external control or not from the external control information 656 (S803). The control mode determination unit 663 determines that the control mode B is optimal in a case where all conditions in which the optical power is normal, there is no external control, the optical noise does not increase, and the bit error increase rate is equal to or less than a predetermined value, are set (S806). In a case where any one condition is not set, the control is performed in the control mode C (S807). After step 806 or step 807, the control mode determination unit 663 determines whether the deletion of the path is set (S808 and S809). At this time, if the deletion of the path is YES, the process is finished and if the deletion of the path is NO, the process returns to step 802.

In the control mode C, a short-term control based on the bit error is not performed and the control unit 661 controls the variable dispersion compensator 653 with the optimal dispersion compensation value on the memory. The optimal dispersion compensation value is adjusted in the control mode A and is stored in the memory just before proceeding to this state. In the case that the variable dispersion compensator 653 keeps the value previously set to the variable dispersion compensator 653 as long as the next different value is not set, it is not necessary to use the compensation value stored in the memory. It will be apparent that the effect of this embodiment is not changed even if the variable dispersion compensator 653 is operated with an immediately-before set value.

As a result, since the compensation value of the variable dispersion compensator is not unnecessarily changed by the bit error caused by factors other than the dispersion of the fiber, the stable dispersion compensation operation can be achieved. Further, according to this embodiment, when the optical power is lost, i.e., the optical power is abnormal, the variable dispersion compensator can be controlled by the optimal dispersion compensation value on the memory. Therefore, when the fiber is firstly removed for repairing and re-connected, etc., the compensation dispersion value is maintained to the original optimal value and in a case when the fiber is re-connected, the service can be rapidly restarted.

As a method for searching the optimal dispersion compensation value in the control mode B, a control method using a representative value of the number of bit errors corresponding to the dispersion compensation value is considered. As the representative value, an average value may be calculated, for example, by repetitively counting the number of bit errors for one minutes 10 times. As another representative value, an optimal value may be searched with any value having the least number by repetitively counting the number of bit errors for five minutes twice. Therefore, the variable dispersion compensator 653 can be stably controlled without unnecessarily changing the dispersion compensation value even though the instant increase of bit errors caused by factors other than the dispersion of the fiber occurs. As a variable range $\Delta Db$ of the variable dispersion compensator 653, a small range not to influence the main signal quality, for example, 10 ps/nm is preferably used, and as a cycle Tb in which the compensation value of the variable dispersion compensator 653 varies, a long term not to react to an instant increase of bit errors caused by the factor other than the dispersion of the fiber, for example, several seconds to several tens minutes are preferably selected.

Referring to FIG. 9, a determination condition of the control mode determination unit 663 will be described. The control mode determination unit 663 supervises an optical power 91, an external control 92, an optical noise 93, and a bit error increase rate 94, and selects a control mode described in determination 95. More specifically, the control mode determination unit 663 determines that the control mode C is optimal in any one OR condition among a condition that the optical power is abnormal (the optical power at main signal wavelength $Ps \leq Pth$), a condition that there is an external control command to transit to the control mode C, a condition that the optical noise is equal to or more than a threshold (generally described in ratio; the optical power at main signal wavelength Ps/the optical noise power $Pn \leq$ signal-to-noise ratio threshold Xn, and a condition that bit error increase rate is greater than the threshold (current number of bit errors−the previous number of bit errors$\geq$bit error increase ratio threshold Xe). The control mode determination unit 663 also determines that the control mode B is optimal in an AND condition among a condition that the optical power is normal, a condition that there is no external control command to transit to the control mode C, a condition that the optical noise is equal to or less than the threshold, and a condition that the bit error increase rate is equal to or less than the threshold.

Herein, a normal range of the optical power is approximately 0 to −10 dBm. Loss of signal (LOS) is included in the abnormality of the optical power. A threshold of the optical noise is set to approximately Xn=20 dB (noise regulation filter width is 0.1 nm) by measuring the noise power of a wavelength other than the above-mentioned ITU grid. A threshold of the bit error increase rate Xe is, for example, 10.

When the control is performed in the control mode C, it is possible to adjust the discrimination point for the optical receiver unit 654 from the control unit 661 of FIG. 6 so as to improve the bit error by using information from the bit error monitoring unit 655.

In the above description, the optical amplifier and the optical noise supervisory unit are individually described and the control unit, the memory, and the control mode determination unit are individually described, but they are only functional descriptions. Actually, the optical amplifier and the optical noise supervisory unit are incorporated in one optical amplifier module and are preferably composed of an Erbium doped optical fiber, a pump laser diode, a control circuit, an optical coupler, a photodiode, an optical filter, etc. The control unit, the memory, and the control mode determination unit can be implemented by appropriate functional allocation with logical circuits such as FPGA, LSI, RAM, etc. or software that operates in a CPU.

In the above-mentioned embodiment, although the bit error monitoring is shown as the quality supervisory means at the output of the optical receiver unit, i.e., in the electrical domain, the effect of this embodiment is not limited thereto. As the quality supervisory means in the same electrical domain, for example, an eye opening monitor may be used.

Although the variable dispersion compensator is installed at the receiver side in the above-mentioned embodiment, the variable dispersion compensator may be installed at a transmission side depending on the transmission design and a control response time required for the dispersion compensation. In this case, the information to be input to the control mode determination unit can be transmitted to the transmission side by means of a supervisory control channel such as the above-mentioned OSC or a vacant overhead, thus, it is apparent that the same effect as the embodiment can be acquired.

Further, in order to improve maintenance operability, the combination of both-end nodes of the path, the used wavelength, and the optimal dispersion compensation value may be stored in the memory at the time of deleting the path. In this case, when it is YES in step 808 or step 809 of FIG. 8, a step of storing the combination of information on the both-end node and the optimal dispersion compensation value in the memory, the node supervisory unit, or the integrated supervisory control unit thereafter is added. Next, when the path is opened in FIG. 7, a clear process in which the initial set value Init is 0 is installed between an optical power supervisory process 702 and an initial set confirmation process 703 is installed, and if the combination of the both-end nodes and the wavelength of this-time path opening is different from the previous combination, the initial set value Init is cleared to 0. Therefore, when the path is opened by the same combination of the node and the wavelength as the previous combination, the variable dispersion compensator can be controlled by the optimal dispersion compensation value without passing through the control mode A. Accordingly, it is possible to rapidly open the path. In the case of a ring network, the information on the both-end nodes and information on a clockwise direction or a counterclockwise direction are stored at a time.

Referring to FIG. 10, the state transition of the optical signal transmission apparatus will be described. A pre-control state 1001 represents a state before the path is opened. In this state, it is supervised whether or not the optical power is abnormal or there is a transition command to the control mode C. When there is a path opening command, the state is transitioned to a control mode A 1002 on the condition that the initial set state Init is 0 and the optical power is normal (S1011).

In the control mode A 1002, the control is continued in the control mode A on the condition that there is no transition command to another state and the optical power is normal. When it is detected that the optical power is abnormal during the control in the control mode A 1002 (NO in step 702 of FIG. 7), the process is transitioned to the pre-control state 1001 (S1012) and the process stands by until the optical power returns to the normal state without changing the value of the initial state Init. When the control is completed in the control mode A, the initial set state is Init=1 and the process is transitioned to a control mode B 1003 or a control mode C 1004 (S1031 and S1041) depending on the optical power, the optical noise, the bit error increase rate, and a transition command from the outside (as shown in FIG. 8).

In the control mode B 1003, when there is no transition command to the control mode A 1002 or the control mode C 1004, the optical power is normal, the optical noise increase is equal to or less than a predetermined value, and the bit error increase rate is also equal to or less than a predetermined value, the control is continued in the control mode B.

In the control mode A 1002 or the control mode B 1003, when there is the transition command, the process is transitioned to the control mode C 1004 (S1041 and S1051). In contrast, in the control mode C 1004, when there is a release command, the process returns to the original control mode A 1002 or the control mode B 1003 (S1042 and S1052).

The control mode B 1003 is transitioned to the control mode C 1004 even when the optical power is abnormal, the optical noise increases, and the bit error rate increases (S1051). Herein, the transition from the control mode A 1002 to the control mode B 1003 is automatically made on the condition of setting to the optimal dispersion compensation value as shown in FIGS. 8 and 9, but the transition from the control mode B 1003 to the control mode A 1002 is not automatically made and is made only when there is the transition command (S1032). As a result, after the path is opened, an unnecessary bit error due to a wide change of the dispersion compensation value such as performed in the control mode A is prevented from being generated.

Meanwhile, when the optical signal transmission apparatus receives the path opening command in the pre-control state 1001 on the condition that the optical power is normal and the initial set state Init is 1, the control mode is transitioned to the control mode B (S1021) without passing through the control mode A. When the release command is received or there is a path deletion command during the control in the control mode B, the control mode B is transitioned to the pre-control state 1001 (S1022).

The pre-control state 1001 is transitioned to the control mode C 1004 by the transition command (S1062). In contrast, the control mode C 1004 is transitioned to the pre-control state 1001 by the release command or the path deletion command (S1061).

In the control mode C, the variable dispersion compensator is controlled by the optimal dispersion compensation value stored in the memory. In order to improve the flexibility of the control, a function to change the compensation value of the variable dispersion compensator may be established by a remote control in the control mode C.

As described above, according to the optical signal transmission apparatus of the embodiment, it is possible to suppress unnecessary variation of a compensation dispersion value of a variable dispersion compensator and perform stable dispersion compensation control by preparing plural control modes having different control methods and selecting any control mode by using optical power information or optical noise information at the time of controlling the variable dispersion compensator. Further, since unnecessary variation of a compensation value is suppressed with respect to the loss of a received main signal, which is caused by removal of a fiber or a transmission failure, it is possible to return to a predetermined main signal quality rapidly after restoring the received main signal.

According to an optical signal transmission apparatus of the embodiments, in a case when a bit error occurs due to a factor other than fiber dispersion, a compensation value of a variable dispersion compensator can be maintained to a previously-set optimal compensation value without being changed, whereby it is possible to provide an optical signal transmission apparatus that never generate unnecessary increase of bit errors. In addition, according to the optical signal transmission apparatus of the present invention, even when the fiber is removed and then reinserted for maintenance or when a main signal is lost due to a transmission path failure, it is possible to provide an optical signal transmission apparatus that can retain a predetermined main signal quality in a short time.

What is claimed is:

1. An optical signal transmission apparatus, comprising:
an optical signal transmitter unit;
a variable dispersion compensator that adjusts a dispersion compensation amount to compensate waveform distortion caused by dispersion of an optical fiber;
a control unit that controls the dispersion compensation amount of the variable dispersion compensator;
a control mode determination unit that designates a control content of the control unit;
an optical receiver unit; and
a signal quality supervisory unit,
wherein the control mode determination unit determines whether or not an optical signal power is within a proper range on the basis of optical power information received from the optical receiver unit, and
the control unit controls the variable dispersion compensator on the basis of a determination result of the control mode determination unit and quality information received from the signal quality supervisory unit,
a non-volatile memory,
wherein the control unit has a first control mode and a second control mode that have different ranges of a dispersion value to be controlled and different control cycles, and has a third control mode controlled by a set value stored in the non-volatile memory, and
a control set value in the first control mode or/and the second control mode is stored in the non-volatile memory and is used as a set value in the third control mode,
wherein different control cycles mean different operations perfomed by the first and the second control modes.

2. The optical signal transmission apparatus according to claim 1, further comprising:
an optical noise supervisory unit,
wherein the control mode determination unit determines an operation in the third mode when determining that optical noise increases more than a normal state on the basis of optical noise information from the optical noise supervisory unit.

3. The optical signal transmission apparatus according to claim 1, wherein the control mode determination unit operates in the third control mode when determining that a reception power is deteriorated or a main signal is lost in the optical receiver unit.

4. The optical signal transmission apparatus according to claim 2, wherein the receiver unit can adjust a discrimination point, and
the control mode determination unit operates in the third control mode and controls the control unit to adjust the discrimination point of the optical receiver unit when determining that the optical noise is greater than a predetermined value on the basis of the optical noise information in the optical noise supervisory unit.

* * * * *